(12) United States Patent
McEnroe et al.

(10) Patent No.: US 7,685,306 B2
(45) Date of Patent: Mar. 23, 2010

(54) STREAMING CONTENT NAVIGATION

(75) Inventors: Elizabeth Rose McEnroe, Palo Alto, CA (US); Thomas H. Taylor, Redmond, WA (US); Mark Wagner, Seattle, WA (US); Peter J. Potrebic, Calistoga, CA (US)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 11/275,649

(22) Filed: Jan. 20, 2006

(65) Prior Publication Data

US 2007/0174476 A1   Jul. 26, 2007

(51) Int. Cl.
*G06F 15/16* (2006.01)
(52) U.S. Cl. .................. 709/231; 709/232; 370/477
(58) Field of Classification Search .................. 709/231
See application file for complete search history.

(56) References Cited

U.S. PATENT DOCUMENTS

| | | | |
|---|---|---|---|
| 5,583,995 A | 12/1996 | Gardner et al. | |
| 5,854,887 A | 12/1998 | Kindell et al. | |
| 5,901,148 A | 5/1999 | Bowen et al. | |
| 5,940,738 A | 8/1999 | Rao | |
| 6,125,396 A | 9/2000 | Lowe | |
| 6,133,910 A | 10/2000 | Stinebruner | |
| 6,466,978 B1 | 10/2002 | Mukherjee et al. | |
| 6,510,556 B1 | 1/2003 | Kusaba et al. | |
| 6,538,656 B1 | 3/2003 | Cheung et al. | |
| 6,795,707 B2 | 9/2004 | Martin et al. | |
| 6,839,070 B2 * | 1/2005 | Meandzija et al. | 715/736 |
| 6,848,004 B1 * | 1/2005 | Chang et al. | 709/232 |
| 6,965,770 B2 | 11/2005 | Walsh et al. | |
| 6,973,038 B1 | 12/2005 | Narendran | |
| 7,068,674 B1 | 6/2006 | Jang et al. | |
| 7,257,132 B1 | 8/2007 | Akamatsu et al. | |
| 7,337,233 B2 | 2/2008 | Dillon | |
| 7,366,199 B1 * | 4/2008 | Vaughan et al. | 370/468 |
| 7,380,264 B2 | 5/2008 | Potrebic | |
| 7,467,218 B2 * | 12/2008 | Gould et al. | 709/231 |
| 7,617,272 B2 * | 11/2009 | Bulson et al. | 709/203 |
| 2001/0049715 A1 | 12/2001 | Kidder | |
| 2002/0083187 A1 | 6/2002 | Sim et al. | |
| 2002/0087696 A1 | 7/2002 | Byrnes | |
| 2002/0097750 A1 | 7/2002 | Gunaseelan et al. | |
| 2002/0112247 A1 | 8/2002 | Horner et al. | |
| 2002/0126698 A1 | 9/2002 | Deshpande | |
| 2002/0133537 A1 | 9/2002 | Lau et al. | |
| 2002/0133589 A1 * | 9/2002 | Gubbi et al. | 709/225 |
| 2003/0009452 A1 | 1/2003 | O'Rourke et al. | |
| 2003/0041164 A1 | 2/2003 | Denecheau et al. | |
| 2003/0048801 A1 | 3/2003 | Sala et al. | |

(Continued)

FOREIGN PATENT DOCUMENTS

KR   20050015528 A   2/2005

(Continued)

*Primary Examiner*—Firmin Backer
*Assistant Examiner*—Jonathan Bui
(74) *Attorney, Agent, or Firm*—Lee & Hayes, PLLC (57) ABSTRACT

Streaming content navigation techniques are described. In an implementation, techniques are described to provide a non-modal message when navigation is attempted to a stream of content that is not permitted for consumption by a client device. In another implementation, techniques are described to provide an alternate content stream when sequential navigation between streams of content is attempted.

18 Claims, 8 Drawing Sheets

U.S. PATENT DOCUMENTS

| | | |
|---|---|---|
| 2003/0050058 A1 | 3/2003 | Walsh et al. |
| 2003/0069964 A1 | 4/2003 | Shteyn et al. |
| 2003/0086413 A1 | 5/2003 | Tartarelli et al. |
| 2003/0093548 A1 | 5/2003 | Cinghita et al. |
| 2003/0115294 A1 | 6/2003 | Hoang |
| 2003/0158890 A1 | 8/2003 | Miller et al. |
| 2003/0177179 A1 | 9/2003 | Jones et al. |
| 2003/0195977 A1 | 10/2003 | Liu et al. |
| 2003/0204848 A1 | 10/2003 | Cheng et al. |
| 2003/0204853 A1 | 10/2003 | Fries et al. |
| 2003/0233540 A1 | 12/2003 | Banerjee et al. |
| 2004/0039834 A1 | 2/2004 | Saunders et al. |
| 2004/0125779 A1 | 7/2004 | Kelton et al. |
| 2004/0163130 A1 | 8/2004 | Gray et al. |
| 2004/0187152 A1 | 9/2004 | Francis et al. |
| 2004/0255323 A1 | 12/2004 | Varadarajan et al. |
| 2005/0005300 A1 | 1/2005 | Putterman et al. |
| 2005/0041595 A1 | 2/2005 | Uzun et al. |
| 2005/0076127 A1 | 4/2005 | Wilson et al. |
| 2005/0102698 A1 | 5/2005 | Bumgardner et al. |
| 2005/0120102 A1 | 6/2005 | Gandhi et al. |
| 2005/0138621 A1 | 6/2005 | Clark et al. |
| 2005/0138663 A1 | 6/2005 | Throckmorton et al. |
| 2005/0138668 A1 | 6/2005 | Gray et al. |
| 2005/0172315 A1 | 8/2005 | Chen |
| 2005/0188415 A1 | 8/2005 | Riley |
| 2005/0198097 A1 | 9/2005 | Kalnitsky |
| 2005/0198662 A1 * | 9/2005 | Endo et al. .................... 725/31 |
| 2005/0213503 A1 * | 9/2005 | Guo et al. .................. 370/230 |
| 2005/0251566 A1 | 11/2005 | Weel |
| 2005/0289618 A1 | 12/2005 | Hardin |
| 2006/0010003 A1 * | 1/2006 | Kruse ............................. 705/1 |
| 2006/0020960 A1 | 1/2006 | Relan et al. |
| 2006/0031887 A1 | 2/2006 | Sparrell et al. |
| 2006/0053452 A1 * | 3/2006 | Lee et al. ...................... 725/81 |
| 2006/0064729 A1 * | 3/2006 | Steading ...................... 725/95 |
| 2006/0080453 A1 * | 4/2006 | Thukral ...................... 709/231 |
| 2006/0098618 A1 * | 5/2006 | Bouffioux .................. 370/349 |
| 2006/0120385 A1 * | 6/2006 | Atchison et al. ............ 370/400 |
| 2006/0126507 A1 * | 6/2006 | Nakayasu ................... 370/229 |
| 2006/0171390 A1 | 8/2006 | La Joie |
| 2006/0179408 A1 * | 8/2006 | Ko .............................. 715/715 |
| 2006/0190589 A1 | 8/2006 | Parker |
| 2006/0195464 A1 * | 8/2006 | Guo .............................. 707/101 |
| 2006/0200412 A1 * | 9/2006 | Fahrny et al. ................. 705/50 |
| 2006/0215558 A1 | 9/2006 | Chow |
| 2006/0235883 A1 * | 10/2006 | Krebs ...................... 707/104.1 |
| 2007/0039033 A1 | 2/2007 | Ota |
| 2007/0089057 A1 | 4/2007 | Kindig |
| 2007/0104146 A1 | 5/2007 | Hossain et al. |
| 2007/0162502 A1 | 7/2007 | Thomas et al. |
| 2007/0174883 A1 * | 7/2007 | McEnroe et al. .............. 725/95 |
| 2008/0034391 A1 | 2/2008 | Lehman et al. |
| 2008/0133701 A1 | 6/2008 | Kazmi et al. |
| 2008/0301736 A1 * | 12/2008 | Heilbron et al. ............... 725/61 |

FOREIGN PATENT DOCUMENTS

WO  WO 2005122025 A2 * 12/2005

* cited by examiner

STREAMING CONTENT NAVIGATION

BACKGROUND

Traditionally, in order to receive television programs, users were limited to broadcasts of the television programs that were received via antennas, from cable providers, and so on. For example, the user may have configured a traditional "over-the-air" antenna, connected a cable to a television set, and so on to receive broadcasts of television programs.

Today, however, users are consistently exposed to content having an ever increasing "richness", such as that experienced in a transition from standard-definition content to enhanced-definition content to high-definition content, and so on. Providing this content to the users, however, may consume a significant amount of bandwidth. For example, a content provider may provide multiple streams of content to hundreds and thousands of locations, e.g., households. Therefore, to ensure that each household may receive content as desired, the content provider may allocate portions of the content to each household. However, each household may be able to consume more content than that which is allocated, which may lead to user frustration when not properly managed, thereby adversely affecting the user's experience with this content.

SUMMARY

Streaming content navigation techniques are described. In an implementation, techniques are described to provide a non-modal message when navigation is attempted to a stream of content that is not permitted for consumption by a client device. The non-modal message may include a portion (e.g., a button) that is selectable to output information regarding consumption of content by another client device.

In other implementations, techniques are described to provide an alternate content stream when sequential navigation between streams of content is attempted, such as when navigating between sequential television channels. The alternate stream of content is used to replace a requested stream of content that is not permitted for consumption, such as due to bandwidth limitations. When sequential navigation is performed from the alternate stream of content (e.g., another sequential navigation input is received), navigation is performed to another stream of content that is ordered sequentially in relation to the stream of content that was replaced, thereby preserving the sequential navigation experience.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Users are continually exposed to ever increasing amounts and varieties of content. Further, the "richness" of this content is ever increasing, such as by providing high-definition content in addition to standard-definition content, by providing surround-sound audio in addition to stereo-sound and "mono" audio, and so on. However, the bandwidth available to provide this content may be limited due to the amount of bandwidth consumed when communicating each of these rich varieties of content.

Therefore, a content provider may allocate a certain amount of bandwidth to each household to ensure that each household is able to consume content. One or more of the households, however, may have an ability to consume more bandwidth than that which is allocated to the household. For example, a household may have a number of client devices (e.g., televisions) that, as a whole, are able to consume more bandwidth (e.g., streams of content) than that which is allocated by the content provider.

Accordingly, bandwidth allocated to the viewing system may be portioned to manage consumption of the content within a household, such as to ensure that the bandwidth allocated to the household is efficiently shared and is not exceeded. For example, a token may be designated for each stream of content (e.g., a television channel having television programs) that is allocated for the household. Therefore, when a client device (e.g., a set-top box) is assigned a token, that client device is authorized to consume content, e.g., to render a television program for viewing, to record the television program for later viewing, and so on. Thus, household consumption of the streams of content (and more particularly consumption by the client devices within the household) may be managed by managing distribution of the tokens.

Additionally, types of tokens that are assigned to the streams of content may reflect different amounts of bandwidth used by respective streams. For instance, a viewing system may be allocated a high-definition content stream and multiple standard-definition content streams. However, because of the different token types, a client device that is assigned a standard-definition token may attempt to navigate to content that is not permitted for consumption by the client device, e.g., the high-definition content. Accordingly, a technique is described in which the client device, when attempting to navigate to content that is not permitted for consumption by the client device, outputs a non-modal message indicating that the requested content is not available. Thus, the non-modal message enables the client device to efficiently navigate through the streams of content (e.g., television channels) without being interrupted by the message, such as to channel surf using "channel up" and/or "channel down" commands.

The non-modal message may also include a portion that is selectable to output information describing stream of content consumption by another client device. For example, the information may describe which other client device includes the high-definition token. This information, when output, may then enable a user to make a decision regarding which client device should be assigned the token. Further discussion of non-modal messages may be found in relation to FIGS. 3-4.

Additionally, streaming content navigation techniques may be employed to replace streams of content that are not permitted for consumption by the client device with streams of content that are permitted. For example, the client device may include a standard-definition token as previously described and attempt to sequentially navigate to a television channel via a "channel up" command. The television channel, however, may be configured to communicate high-definition content and therefore use an amount of bandwidth that is not permitted for consumption by the client device when using the standard-definition token. Therefore, the client device may navigate to television channel having content that matches the content available via the requested television channel but uses less bandwidth than the requested channel, e.g., standard definition content.

Further, in order to preserve the sequential nature of "channel surfing" performed by the client device in this example, the client device may navigate to another television channel that is sequentially ordered in relation to the originally requested television channel when another sequential navigation input is received, e.g., another "channel up" or "channel down" command. Thus, in this example, the user is not forced to "skip around" orderings of television channels when attempting sequential navigation. Further discussion of sequential navigation may be found in relation to FIGS. 5-6.

In the following discussion, an exemplary environment is first described which is operable to employ streaming content navigation techniques. Exemplary procedures are then described which may be implemented by the exemplary environment, as well as in other environments. Exemplary systems are also described which may implement portions of the exemplary environment.

Exemplary Environment

Figure 1:
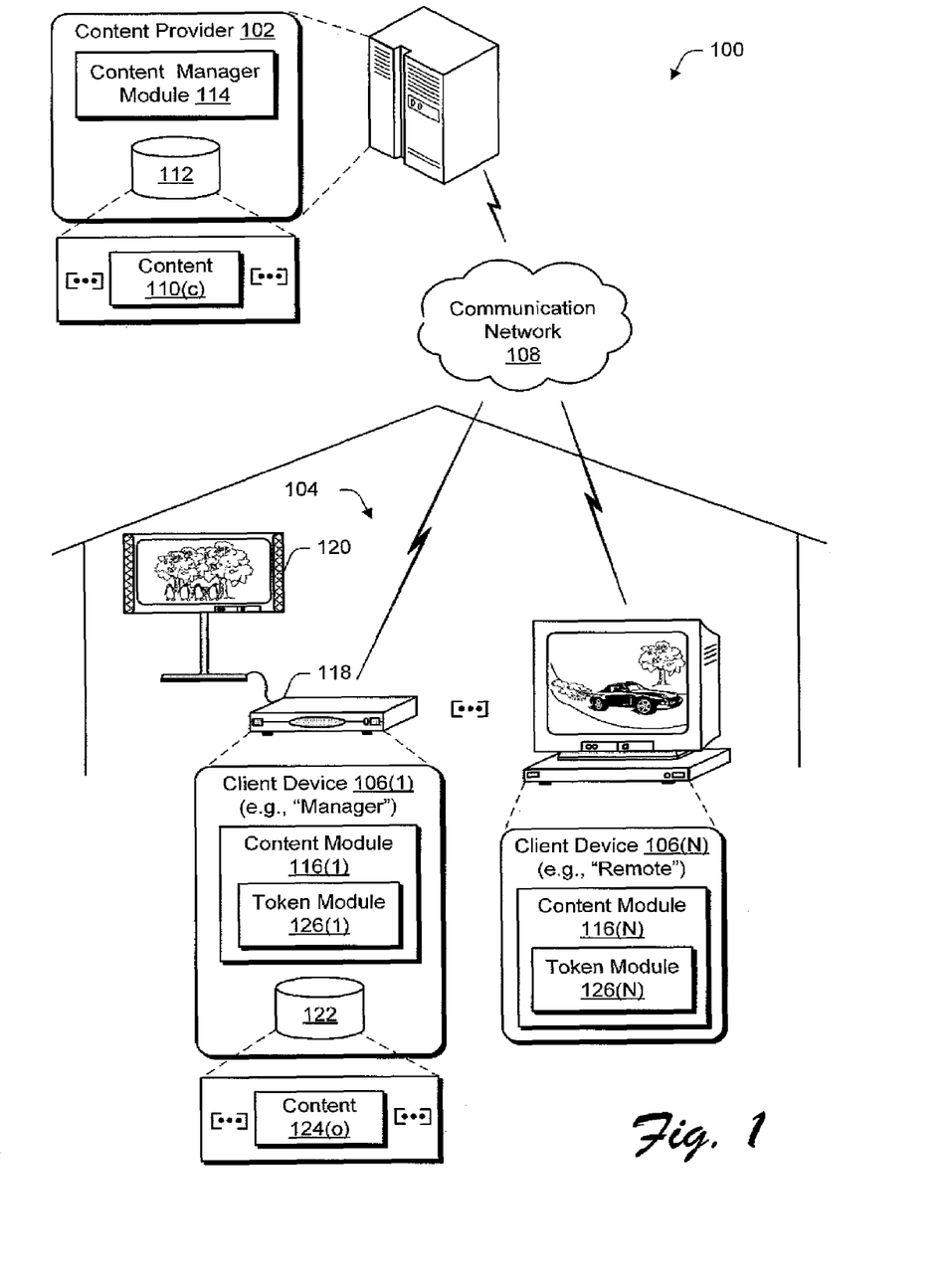
FIG. 1 is an illustration of an environment in an exemplary implementation that is operable to employ streaming content navigation techniques.

FIG. 1 illustrates an environment 100 in an exemplary implementation that is configured to employ streaming content navigation techniques. Although the environment 100 of FIG. 1 is illustrated as an IP-based television (IPTV) environment, the environment 100 may assume a wide variety of other configurations, such as a traditional television broadcast environment, a broadcast environment with back-channel communication capabilities, and so on.

The environment 100 includes a content provider 102 (which may be representative of multiple content providers) and a viewing system 104 that can include any number of client devices, which are illustrated as client devices 106(1)-106(N). The viewing system 104 is illustrated as a household viewing system that has several viewing areas (e.g., different rooms) for viewing content, such as television programming. Although the viewing system 104 is depicted as employed within a particular premises (e.g., the household), it should be apparent that the viewing system 104 may also be employed in multiple premises without departing from the spirit and scope thereof The viewing system 104 is configured for communication with the content provider 102 via a communication network 108 which, in this example, is an IP-based network. The content provider 102 is illustrated as including a variety of content 110(c) (where "c" can be any integer from one to "C") that is stored in storage 112, e.g., a computer-readable medium.

The content 110(c) may be configured for distribution over the communication network 108 (e.g., through execution of a content manager module 114) in a variety of ways. For example, the content 110(c) may include any form of television programs, commercials, music, movies, video-on-demand (VOD), pay-per-view (PPV), movies and other media content, recorded media content, interactive games, network-based applications, and any other similar audio, video, and/or image content. In addition, content 110(c) in general may include music streamed from a computing device to one or more of the client devices 106(1)-106(N), such as a television-based set-top box, and may also include video-on-demand (VOD) media content delivered from a server, a photo slideshow, and any other audio, video, and/or image content received from any type of content source, further discussion of which may be found in relation to FIG. 8.

To control consumption of the content 110(c) received from over the communication network 108 (as well as content that is available locally), each of the client devices 106(1)-106(N) is illustrated as including a respective content module 116(1)-116(N). The content modules 116(1)-116(N) are executable to provide a wide variety of functionality related to content consumption. For example, the content modules 116(1)-116(N) may be executed to communicate with the content provider 102 (and more particularly the content manager module 114) to request particular content 110(c). For instance, the content module 116(1), when executed, may provide authentication and billing information to order VOD, PPV, and so on. In another example, the content modules 116(1)-116(N) are executable to decompress and decrypt content 110(c) received from the communication network 108 and provide other digital rights management functionality. A variety of other examples are also contemplated.

Client device 106(1), for instance, is illustrated as being implemented by a set-top box 118 that is communicatively coupled to a display device 120, such as any type of television, monitor, or similar television-based display system that renders audio, video, and/or image data. Client 106(1) is also illustrated as including digital video recorder (DVR) functionality. For example, client device 106(1), through execution of the content module 116(1), may record content 110(c) received from the content provider 102 over the communication network 108 in storage 122 as content 124(o), where "o" can be any integer from one to "O". Therefore, client device 106(1) may output the content 124(o) from storage 122 at a later time as desired by a user of the client device 106(1). Further, the client device 106(1) (e.g., through execution of the content module 116(1)) may provide other DVR related functionality, such as "time shifting" an output of the content 124(o), e.g., by pausing playback of content 124(o) through use of a pause buffer.

The viewing system 104 may also utilize a variety of other techniques to record content. For example, the storage 122 may be implemented as an independent component of the viewing system 104 and connected to the manager client device 106(1). Alternatively, the storage 122 may be implemented as a component of the manager client device 106(1) as illustrated, which manages recordings initiated from any of the other remote client devices 106(2)-106(N). In yet another embodiment, the storage 122 may be a distributed recording system where any one or more of the client devices 106(1)-106(N) include recording media that is centrally managed by the manager client device 106(1). In still yet another embodiment, the storage 122 may be implemented by the content provider 102 (e.g., when configured as a head end) and managed by the manager client device 106(1) as a "network digital video recorder" (NDVR). In other words, the storage 122 may also be provided as a "drive in the sky" that is responsive to one or more of the client devices 106(1)-106(N).

Although a few examples of client devices 106(1)-106(N) have been described, the client devices 106(1)-106(N) may also be configured in a wide variety of other ways, such as wireless phones, game consoles, "media centers", and so on. For example, client device 106(N) is illustrated in FIG. 1 as a set-top box that does not include DVR functionality, unlike client device 106(1) of FIG. 1. Thus, the client devices 106(1)-106(N) may be implemented in a variety of different ways to provide different amounts of functionality (e.g., "thin" or "thick" devices) with any number and combination of differing components, an example of which is further described with reference to the exemplary client device 106(n) shown in FIG. 7. Likewise, the environment 100 may be implemented with any number and combination of differing components, an example of which is described below with reference to the exemplary entertainment and information system 800 shown in FIG. 8.

Content 110(c) may be allocated to the client devices 106(1)-106(N) by the content provider 102 in a variety of ways. For example, each of the premises (e.g., the illustrated household) may be allocated a certain amount of bandwidth by the content provider 102. The premises may then use one or more techniques to determine which clients 106(1)106(N) receive portions of the allocated bandwidth. In other words, the viewing system 104 (itself) may allocate which portion of the bandwidth allocated to viewing system 104 is provided to particular client devices 106(1)-106(N) within the viewing system 104.

In the exemplary viewing system 104, for instance, client device 106(1) is depicted as a "manager" client device that is responsible for allocating the streams, thereby managing distribution of the content streams to one or more of the other "remote" client devices, such as client device 106(N). Thus, the "manager" client device 106(1) manages content 110(c) consumption within the viewing system 104, which may be performed using a variety of techniques.

Each of the client devices 106(1)-106(N), for instance, may include a respective token module 126(1)-126(N) that is responsible for maintaining tokens that determine which of the client devices 106(1)-106(N) are authorized to receive content 110(c) from the content provider 102. The "remote" client device 106(N), for example, may connect to the manager client device 106(1) to receive a content stream for live television using a token. Additionally, the remote client device 106(N) may connect to the manager client device 106(1) to received content which does not require a token for consumption, such as delayed program viewing, and/or recorded DVR playback from content 124(o) stored in storage 122 of the manager client device 106(1). In another example, the remote client device 106(N) may receive the content 110(c) directly from the communication network 108 (e.g., without "going through" the manager client device 106(1) but is authorized to do so when the client 106(N) has a token that is assigned by the manager client device 106(1). A variety of other examples are also contemplated, such as through use of tokens which represent differing amounts of bandwidth, further discussion of which may be found in relation to FIG. 2. Thus, the manager client device 106(1) may arbitrate which client devices 106(1)-106(N), including the manager client device 106(1) itself, are authorized to receive and/or output the content 110(c).

Although "manager/remote" architecture has been described to manage content consumption in the viewing system 104, a variety of other architectures are also contemplated without departing from the spirit and scope thereof. For example, the functionality of the "manager" may be distributed among each of the client devices 106(1)-106(N) such that arbitration of content consumption is performed by each of the devices. For instance, each of the client devices 106(1)-106(N) may implement similar techniques to manage token distribution (e.g., through execution of respective token modules 126(1)-126(N)) such that the devices "agree" based on common procedures as to which of the client devices 106(1)-106(N) is to be assigned a token and therefore is authorized to consume content. A variety of other examples are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 7. The features of the streaming content navigation techniques described below are platform-independent, meaning that the techniques may be implemented on a variety of commercial computing platforms having a variety of processors.

Figure 2:
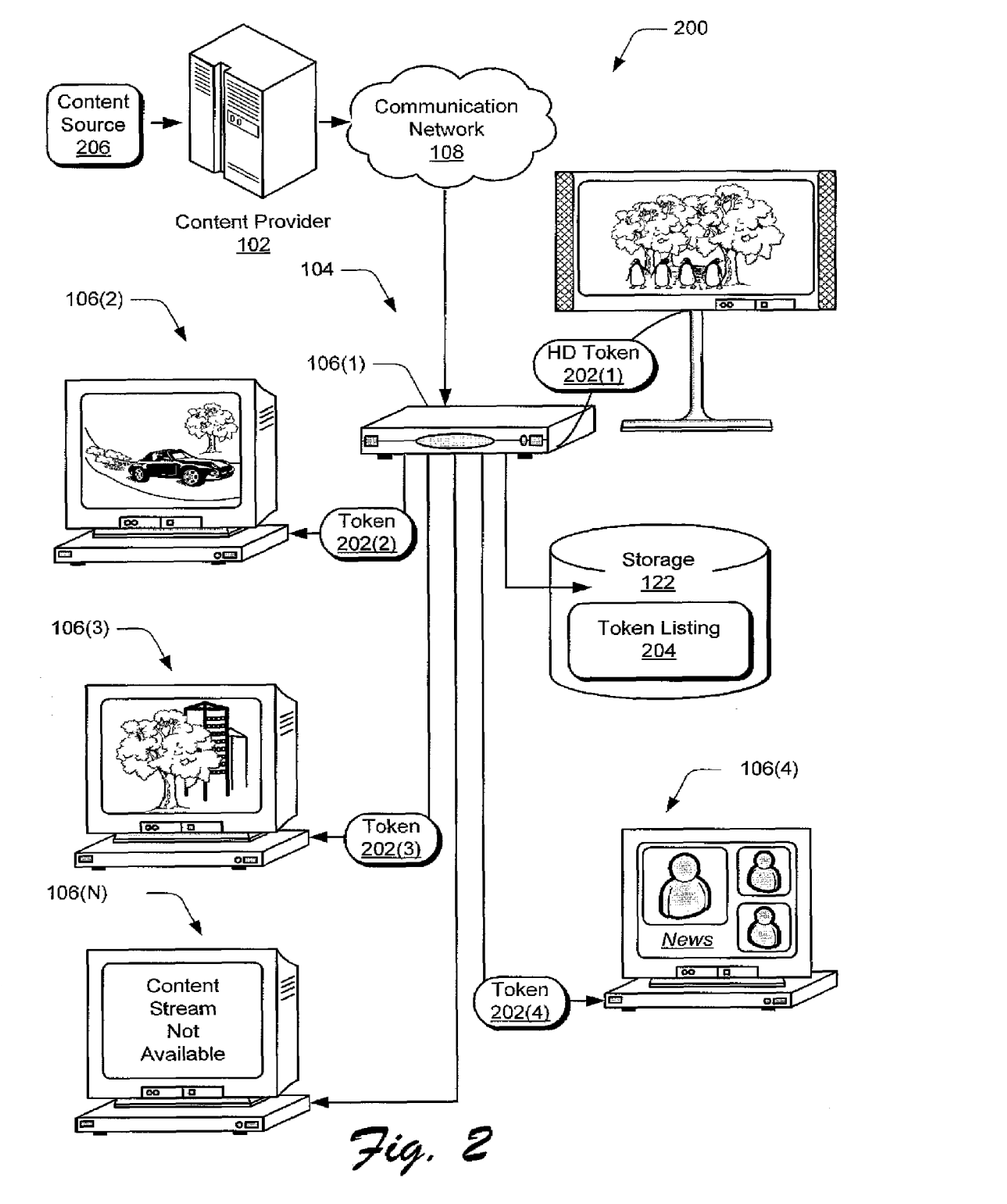
FIG. 2 is an illustration of an exemplary implementation of a system showing allocation of content from a content provider by a viewing system of FIG. 1 in greater detail.

FIG. 2 illustrates an exemplary implementation of a system 200 showing allocation of content from the content provider 102 by the viewing system 104 of FIG. 1 in greater detail. The illustrated viewing system 104 includes a plurality of client devices 106(1), 106(2), 106(3), 106(4) and 106(N). In this system, the manager client device 106(1) arbitrates control of four (4) streams of content (also referred to hereafter as "content streams") from the content provider 102 via the communication network 108. For example, the content streams may be obtained by the remote clients 106(2)-106(N) through the manager client device 106(1). In another example, the content streams are managed by the manager client device 106(1), but the remote client devices 106(2)-106(N) receive the streams directly from the communication network 108. A variety of other examples are also contemplated.

Although the content streams are not shown specifically, the illustrated communication links illustrate various communication links which are configured to communicate the content streams. Additionally, the communication links are not intended to be interpreted as a one-way communication link, but rather may also represent two-way communication. A viewing selection from a first content stream is shown for viewing on display device at the manager client device 106(1). A second content stream is illustrated as directed from the manager client device 106(1) to the remote client device 106(2). Similarly, a third content stream is directed from the manager client device 106(1) to the remote client device 106(3) and a viewing selection from the third content stream is shown for viewing on a respective display device. Likewise, a fourth content stream is directed from the manager client device 106(1) to the remote client device 106(4) and a viewing selection from the fourth content stream is shown for viewing on a respective display device.

The available bandwidth for the viewing system 104, however, may not be able to accommodate as many content streams as there are client devices. As illustrated in FIG. 2, for instance, it is not unusual for a household to have five (5) or more televisions in various rooms and at various locations throughout the household. In this instance, the number of client devices exceeds the number of content streams allocated to the viewing system 104 from the content provider 102. For example, the viewing system 104 is depicted as including at least a fifth client device 106(N) of the viewing system 104. The corresponding display device of the client device 106(N) indicates that a content stream is not available, because the content streams allocated to the viewing system 104 (e.g., the four content streams) have already been directed to the other client devices 106(1)-106(4). In such an instance, client device 106(N) may watch a previously recorded content, tune to one of the streams that another client device is consuming, and so on.

In the illustrated system 200 of FIG. 2, a technique is shown which utilizes tokens 202(1)-202(4) to arbitrate control of which of the client devices 106(1)-106(N) of the viewing system 104 are authorized to consume content 110(c) of FIG. 1 from the content provider 102. For example, each of the remote client devices 106(2)-106(N) may communicate with the manager client device 106(1) to receive a respective token 202(1)-202(4) that enables the respective remote client device 106(2)-106(N) to consume the content 110(c), such as render the content 110(c) for viewing. The manager client device 106(1), for instance, may maintain a token listing 204 in storage 122 which lists which tokens 202(1)-202(4) have been assigned to which respective client devices 106(1)-106(4). In the illustrated example, because client device 106(N) does not include one of the tokens 202(1)-202(N), the client device 106(N) is not authorized to consume content 110(c) from the content provider 102. A variety of techniques may be utilized to determine which clients receive tokens at a particular time, such as a priority listing, random number comparison (e.g., each client device generates a random number with the "higher" or "lower" number indicating who "wins" and is thus authorized to output content 110(c)), which device has been idle (e.g., has not received a user input) for a greatest amount of time, ordered by display device screen size, ordered by priority of locations, determined based on respective costs of the content, and so on.

The content streams allocated by the content provider 102 to the viewing system 104 may be configured in a variety of ways, such as a combination of high definition (HD) and/or standard definition (SD) content streams. For example, the viewing system 104 may receive one (1) high definition (HD) content stream and three (3) standard definition (SD) content streams depending upon available bandwidth to deliver the content streams over the communication network 108. As more bandwidth becomes available, the viewing system 104 may receive more high definition and/or standard definition content streams. Accordingly, the tokens 202(1)-202(4) may be configured to allocate these particular types of content streams. For example, token 202(1) is illustrated as an "HD token" and therefore a client device having that token 202(1) (e.g., the manager client device 106(1) in the illustration of FIG. 2) is authorized to receive and/or output the HD content stream. Because the other client devices 106(2)-106(4) do not have the HD token, however, these devices are restricted in this instance to receive and/or output a standard-definition content stream. Although HD and SD content has been described, a wide variety of other bandwidths and corresponding content is also contemplated, such as picture-in-picture (PIP) streams and corresponding PIP tokens.

Additionally, the content provider 102 may provide content streams with matching content but that consume different amounts of bandwidth to the viewing system 104. For example, the content provider 102 may receive a stream of content from a content source 206 that includes high-definition content and accordingly use a "high-definition" amount of bandwidth. The content provider 102 may then provide this high-definition stream of content over the communication network 108 for consumption by the viewing system 104. As previously described, however, each of the client devices 106(1)-106(N) in the viewing system 104 may not be able to consume high-definition content concurrently, such as due to bandwidth limitations. Therefore, the content provider 102 may also reformat the high-definition stream into another type of stream having reduced bandwidth, such as a standard-definition stream that has matching content. Therefore, client devices 106(2)-106(4) having respective standard-definition tokens 202(2)-202(4) may also access the content, but not in the high-definition format that is available to the client device 106(1) having the HD token 202(1). Further discussion of navigation between the content streams by the client devices 106(1)-106(N) may be found in relation to FIGS. 3-6.

Thus, in the system 200 of FIG. 2, the manager client device 106(1) is responsible for controlling which clients are authorized to output content streams from the content provider 102. The manager client device 106(1) may also be configured to provide additional functionality to the viewing system 104. For example, the manager client device 106(1) may be configured to control content recordation performed by the viewing system 104, whether the recordation occurs locally at the manager, distributed across the viewing system 104, remotely as a network digital video recorder (NDVR), and so on. This recordation may also be managed through the use of tokens, since a portion of the bandwidth from the content provider 102 is consumed by recording the content in storage 122. In another example, the manager client device 106(1) may act as a "playback service" such that the remote client devices 106(2)-106(N) may request content from the manager client device 106(1) that does not use tokens for consumption, e.g., to stream content 124(o) from storage 122. In a further example, the manager client device 106(1) may manage consumption of content using tokens that have already been assigned, e.g., to show a notification to the remote devices that, if not answered, causes the respective token to be removed for use by the manager client device 106(1) to record content. A variety of other examples are also contemplated, further discussion of which may be found in relation to the following exemplary procedures.

Exemplary Procedures

The following discussion describes streaming content navigation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
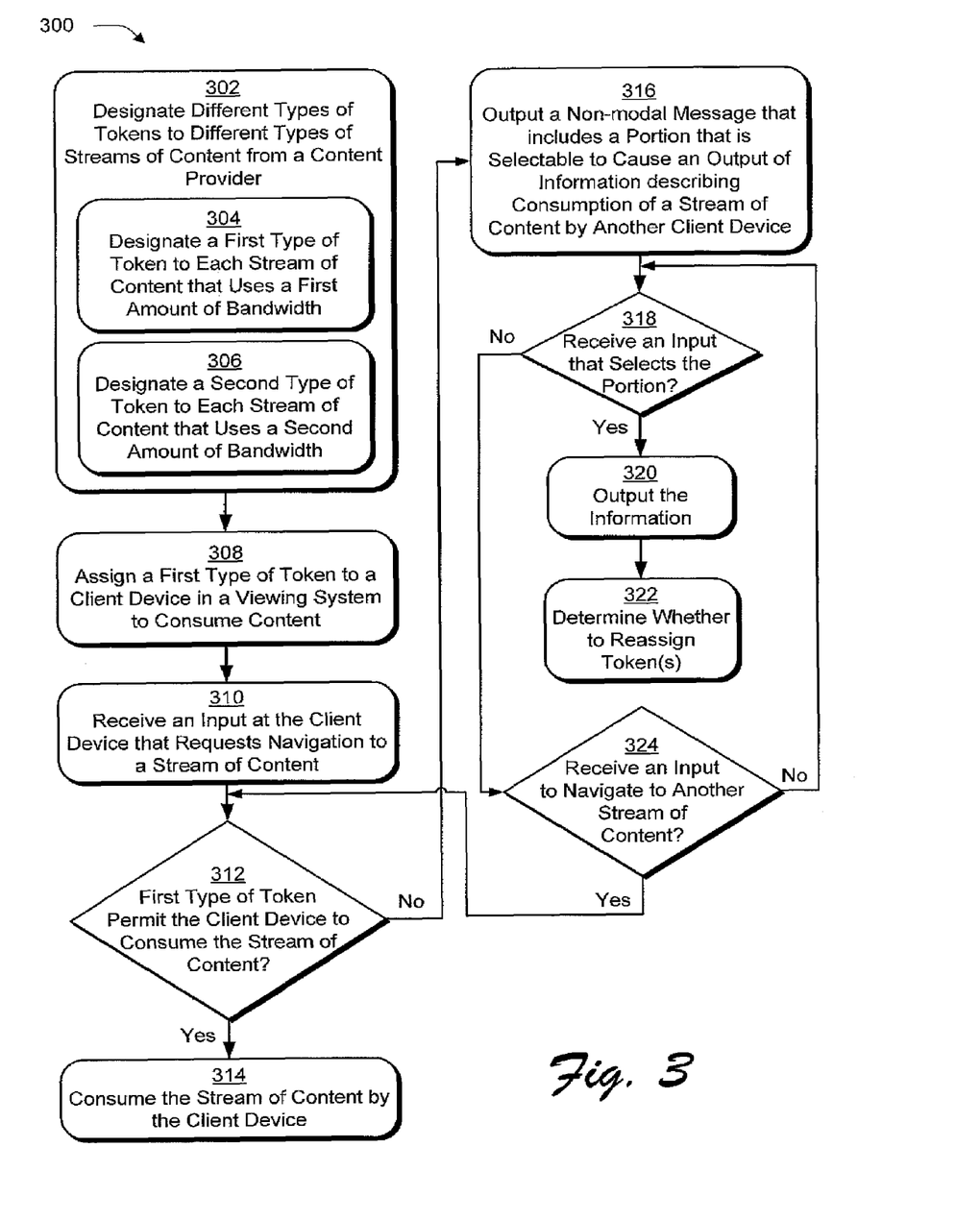
FIG. 3 is a flow diagram depicting a procedure in an exemplary implementation in which a viewing system of FIG. 2 uses different types of tokens to manage different types of content. A non-modal message is output by a client device when the client device is assigned a token having a type that does not correspond to a type of content requested by the client device.
Figure 4:
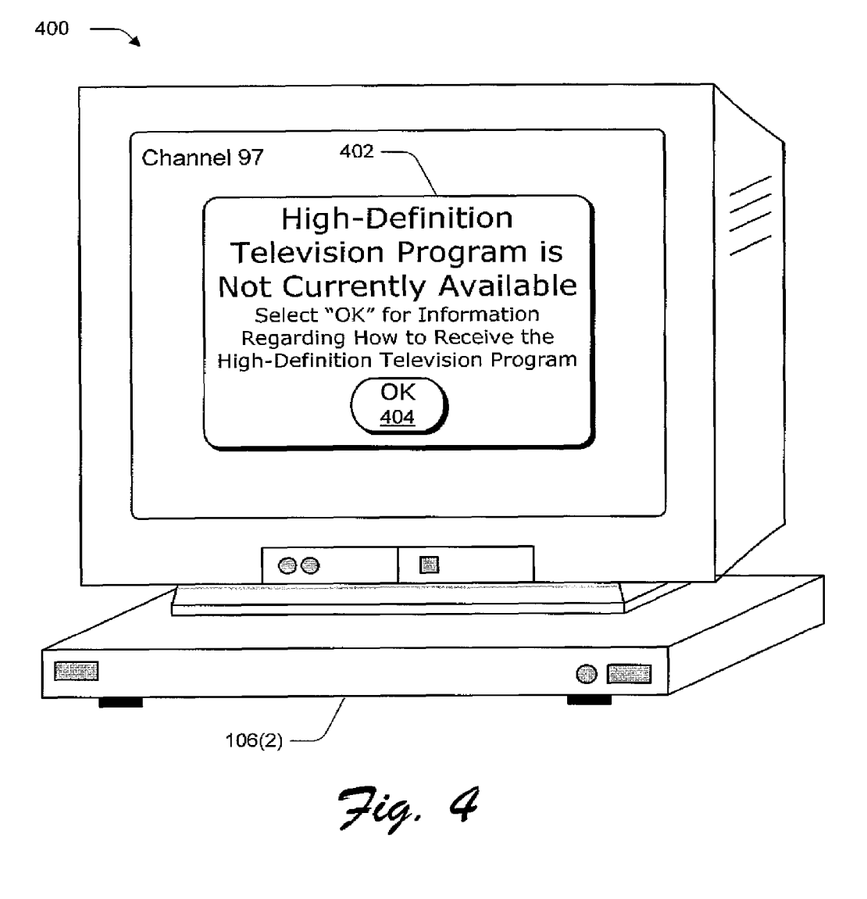
FIG. 4 is an illustration in an exemplary implementation showing output of a non-modal message accordingly to the procedure of FIG. 3.

FIG. 3 depicts a procedure 300 in an exemplary implementation in which a viewing system uses different types of tokens to manage different types of content. In this exemplary implementation, a non-modal message is output by a client device when the client device is assigned a token having a type that does not correspond to a type of the requested content. FIG. 4 illustrates an exemplary implementation 400 showing output of a non-modal message accordingly to the procedure of FIG. 3, and therefore the discussion of FIG. 3 also references FIG. 4.

Different types of tokens are designated to different types of streams of content from a content provider (block 302). For example, the content provider 102 may provide four streams of content to each of a plurality of locations serviced by the content provider 102, such as individual households. Three of the streams of content may be configured for standard definition (SD) content, while one of the streams of content is configured for high-definition (HD) content, an example of which is shown in FIG. 2.

Accordingly, a first type of token is designated to each stream of content that uses a first amount of bandwidth (block 304) and a second type of token is designated to each stream of content that uses a second amount of bandwidth (block 306). Continuing with the previous example, an SD token may be assigned to each SD stream and an HD token may be assigned to each HD stream such that the viewing system 104 includes one HD token (e.g., HD token 202(1)) and three SD tokens (e.g., tokens 202(2)-202(4)). The designating may be performed in a variety of ways, such as by pre-configuring the client devices 106(1)-106(N) to have a number and type of tokens which corresponds to the content provider 102, dynamic determination (e.g. the manager client device 106(1) examines content streamed over the communication network 108 to determine how many streams and of what type are available), and so forth.

A first type of token is assigned to a client device in a viewing system to consume content (block 308). The remote client device 106(2), for example, may communicate with the manager client device 106(1) when "powered on" to request content consumption. In this example, the manager client device 106(1) has already been assigned the HD token 202(1) and therefore assigns an SD token 202(2) to the remote client device 106(2) to consume content 110(c) from over the communication network 108.

An input is received at the client device that requests navigation to a stream of content (block 310). For example, a user may utilize a remote control to enter a channel number, use sequential navigation via a "channel up" or "channel down" command, and so on. A determination is then made as to whether the first type of token permits the client device to consume the stream of content (decision block 312). The remote client device 106(2) (or the manager client device 106(1)), for instance, may examine the requested stream of content to determine a "type" for the stream, e.g., high definition versus standard definition. When the type of the content stream corresponds to a permissible type indicated by the token ("yes" from decision block 312), the stream of content is consumed by the client device (block 314), such as rendered for output, stored in storage using DVR functionality, and so on. Continuing with the previous example, when the stream of content is standard-definition content that corresponds to the standard-definition token 202(2), the remote client device 106(2) is permitted to consume the content.

However, when the first type of token does not permit the client device to consume the stream of content ("no" from decision block 312), a non-modal message is output that is selectable (e.g., through pressing a button in the message, by pressing a button on a remote control, and so on) to cause an output of information describing consumption of the streams of content by other client devices (block 316). For example, the remote client device 106(2) may be assigned an SD token 202(2) but the content requested is HD content. Therefore, the remote client device 106(2) may output a message that is non-modal and therefore does not interrupt navigation by transferring the client device 106(2) to a different mode that requires user input to return back to the previous mode, an example of which is shown in the exemplary implementation 400 of FIG. 4.

FIG. 4 illustrates the remote client device 106(2) as outputting and rendering a non-modal message 402. The message is non-modal, in that, a user of the client device 106(2) may continue navigating through streams of content and is not interrupted by the output of the message. Even though the message 402 is non-modal, the message 402 includes a portion 404 (configured as a button in this implementation) which is selectable to cause information to be output that describes content use by another client device.

A determination is then made whether an input has been received that selects the portion (decision block 318). If so ("yes" from decision block 318), the information is output (block 320) and a determination is made regarding whether to reassign token(s) (block 322). For example, the information may describe which other client devices are in the viewing system 104 and the tokens that are assigned to the respective client devices to consume content. The information may also describe content that is being consumed using the tokens, such as a content type (e.g., high or standard definition), title, genre, and so on. Using this information, a user may then decide whether to reassign tokens based on this information, e.g., to assign the HD token 202(1) to the remote client device 106(1) and the SD token 202(2) to the manager client device 106(1). A variety of other examples are also contemplated.

When an input has not been received that selects the portion ("no" from decision block 318), a determination is made as to whether an input has been received to navigate to another stream of content (decision block 324). If not ("no" from decision block 324), the client device may continue determining whether the portion has been selected (decision block 318).

When an input has been received to navigate to another stream of content ("yes" from decision block 324), a determination is made as to whether the first type of token permits the client device to consume the stream of content (decision block 312). Thus, a user may navigate from the stream of content that is not permitted for consumption without interacting with the message and thus the message is "non-modal".

Figure 5:
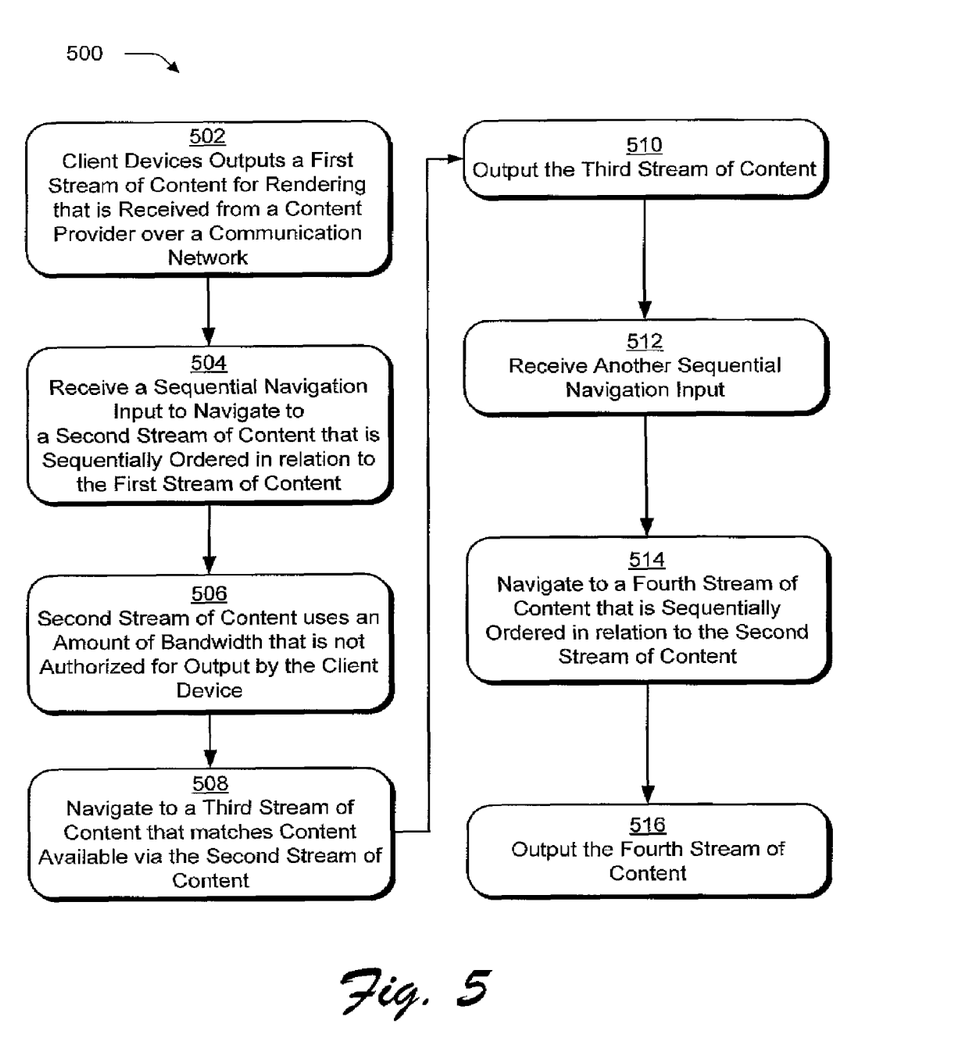
FIG. 5 is a flow diagram depicting a procedure in an exemplary implementation in which an alternate stream of content is obtained during sequential navigation to replace a stream of content that is not available.

FIG. 5 depicts a procedure 500 in an exemplary implementation in which an alternate stream of content is obtained during sequential navigation to replace a stream of content that is not available. A client device outputs a first stream of content for rendering that is received from a content provider over a communication network (block 502). As previously described, the first stream of content may be configured in a wide variety of ways, such as to include television programs, VOD, PPV movies, digital radio, and so on.

During the output, a sequential navigation input is received to navigate to a second stream of content that is sequentially ordered in relation to the first stream of content (block 504). For example, a user may provide an input to navigate from a digital radio stream to a video-on-demand stream. However, the second stream of content may use an amount of bandwidth that is not authorized for output by the client device (block 506).

Therefore, the client device navigates to a third stream of content that matches content available via the second stream of content (block 508). For example, the client device 106(N)

may execute a respective content module 116(N) to locate matching content, such as through examination of a program guide (i.e., an "EPG"), direct examination of content streams received from the content provider 102 (e.g., by reading metadata included in the streams), and so on. The matching content, however, uses an amount of bandwidth that is authorized for output by the client device, and thus, the client device may output the third stream of content (block 510).

The client device may then receive another sequential navigation input (block 512). In response to the input, the client device navigates to a fourth stream of content that is sequentially ordered in relation to the second stream of content (block 514) and outputs the fourth stream of content (block 516). Thus, sequential navigation between the content streams is preserved.

For example, a user may navigate between three sequentially ordered channels, such as channels "2", "4" and "32". The channels are sequentially navigable such that a user may provide a single sequential navigation input (e.g., a "channel up" command) to navigate from channel "2" to channel "4", and likewise provide another single sequential navigation input to navigate from channel "4" to channel "32". A client device used by the user, however, may have an SD token and channel "4" may have high-definition content. Therefore, the client device, through execution of the content module, navigates to another channel having matching content (e.g., channel "506"), such that the user may view content that is provided via channel "4". When another "channel up" input is received, the client device navigates from channel "506" to channel "32", thereby preserving the sequential navigation and not forcing the user to "jump around" the channel ordering, such as by tuning from channel "506" to channel "507". A variety of other examples are also contemplated.

Figure 6:
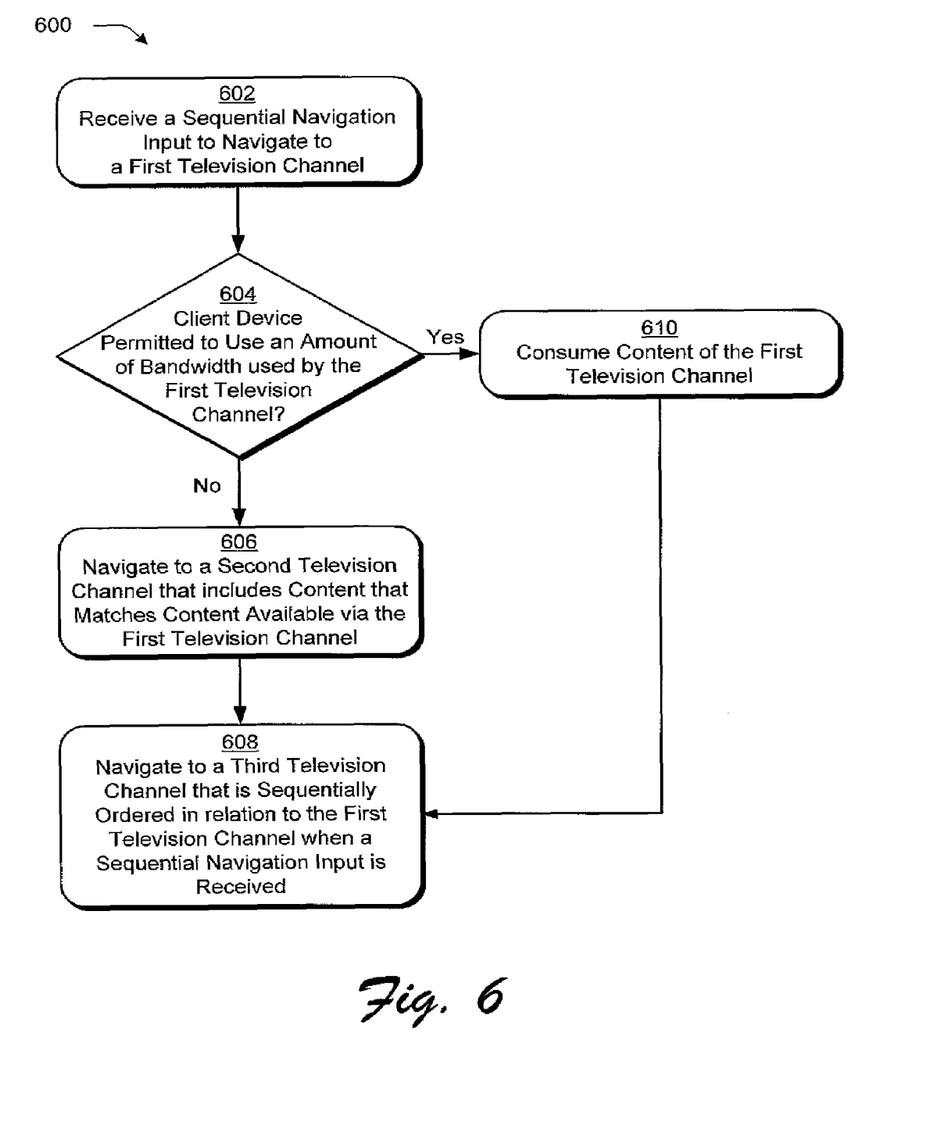
FIG. 6 depicts a procedure in an exemplary implementation in which sequential navigation through television channels is described, in which, the television channels use differing amounts of bandwidth.

FIG. 6 depicts a procedure in an exemplary implementation in which sequential navigation through television channels is described, in which, the television channels use differing amounts of bandwidth. A sequential navigation input is received to navigate to a first television channel (block 602). For example, a user may press a "channel down" button on a remote control.

A determination is then made as to whether the client device is permitted to use an amount of bandwidth employed by the first television channel (decision block 604). If not ("no" from decision block 604), the client device navigates to a second television channel that includes content that matches content available via the first television channel (block 606). The client device then navigates to a third television channel that is sequentially ordered in relation to the first television channel (e.g., in a program guide) when a sequential navigation input is received (block 608), such as during output of the second television channel. Thus, the second television channel in this instance is used to replace content that is not available to the client device via the first television channel.

When the client device is permitted to use an amount of bandwidth employed by the first television channel ("yes" from decision block 604), the client device consumes content of the first television channel (block 610). The client device then navigates to a third television channel that is sequentially ordered in relation to the first television channel when a sequential navigation input is received (block 608). Thus, as shown in this example, the client device sequentially navigates between the television channels in their assigned order (e.g., a channel ordering of a content provider) regardless of whether a television channel is used to replace content that is not available to the client device. A variety of other examples are also contemplated, such as navigation through PPV movies, VOD, and so on.

Exemplary Systems

Figure 7:
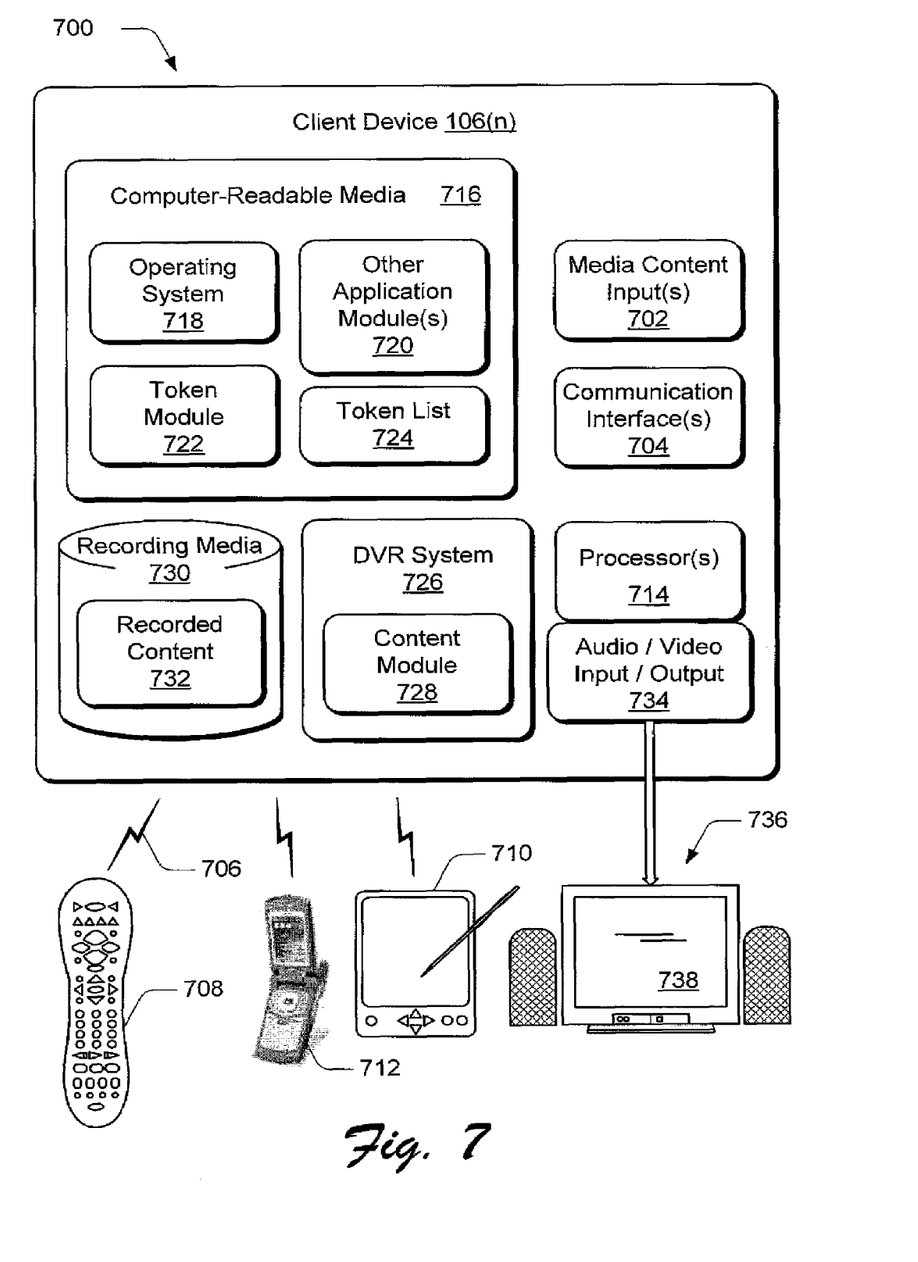
FIG. 7 illustrates an exemplary implementation of a client device of FIGS. 1 and 2 in greater detail.

FIG. 7 illustrates an exemplary implementation 700 of a client device 106(n) (which may or may not correspond to one or more of the client devices 106(1)-106(N) of FIG. 2) in greater detail. The client device 106(n) may be implemented as any form of a computing, electronic, and/or television-based client device.

Client device 106(n), as illustrated in FIG. 7, includes one or more media content inputs 702 which may include Internet Protocol (IP) inputs over which streams of media content are received via an IP-based network. Client device 106(n) further includes communication interface(s) 704 which can be implemented as any one or more of a serial and/or parallel interface, a wireless interface, any type of network interface, a modem, and as any other type of communication interface. A wireless interface enables client device 106(n) to receive control input commands 706 and other information from an input device, such as from remote control device 708, PDA (personal digital assistant) 710, cellular phone 712, or from another infrared (IR), 802.11, Bluetooth, or similar radio frequency (RF) input device.

A network interface provides a connection between the client device 106(n) and a communication network by which other electronic and computing devices can communicate data with device 106(n). Similarly, a serial and/or parallel interface provides for data communication directly between client device 106(n) and the other electronic or computing devices. A modem facilitates client device 106(n) communication with other electronic and computing devices via a conventional telephone line, a digital subscriber line (DSL) connection, cable, and/or other type of connection.

Client device 106(n) also includes one or more processors 714 (e.g., any of microprocessors, controllers, and the like) which process various computer executable instructions to control the operation of client device 106(n), such as to communicate with other electronic and computing devices. Client device 106(n) can be implemented with computer-readable media 716, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like. It should be apparent that although a single computer-readable media 716 is illustrated, the computer readable media 716 may be representative of multiple types and combinations of computer-readable media.

Computer-readable media 716 provides data storage mechanisms to store various information and/or data such as software applications and any other types of information and data related to operational aspects of client device 106(n). For example, an operating system 718 and/or other application modules 720 can be maintained as software applications with the computer-readable media 716 and executed on the processor(s) 714.

For example, one or more of the other application modules 720 can be implemented as a program guide application that processes program guide data and generates program guides for display. The program guides enable a viewer to navigate through an onscreen display and locate broadcast programs, recorded programs, video-on-demand (VOD), movies, interactive game selections, network-based applications, and other media access information or content of interest to the viewer. Likewise, the computer-readable media 716 may also store the token module 722 and/or token listing 724 that may be used to manage tokens (and therefore content consumption) as previously described in relation to FIGS. 1-2. The client device 106(n) may also include a DVR system 726 with the content module 728 (which may or may not correspond to the content modules 116(1)-116(N) of FIG. 1) and recording media 770 (which may or may not correspond to the storage 122 of FIG. 1) to maintain recorded content 772.

The client device 106(n), as illustrated, also includes an audio and/or video input/output 774. The audio/video input/output 774 may be utilized for a variety of purposes, such as to provide audio and video to an audio rendering and/or display system 776 and/or to other devices that process, display, and/or otherwise render audio, video, and image data. Video signals and audio signals, for instance, may be communicated from client device 106(n) to a television 778 (or to other types of display devices) via an RF (radio frequency) link, S-video link, composite video link, component video link, analog audio connection, or one or more other such communication links.

Figure 8:
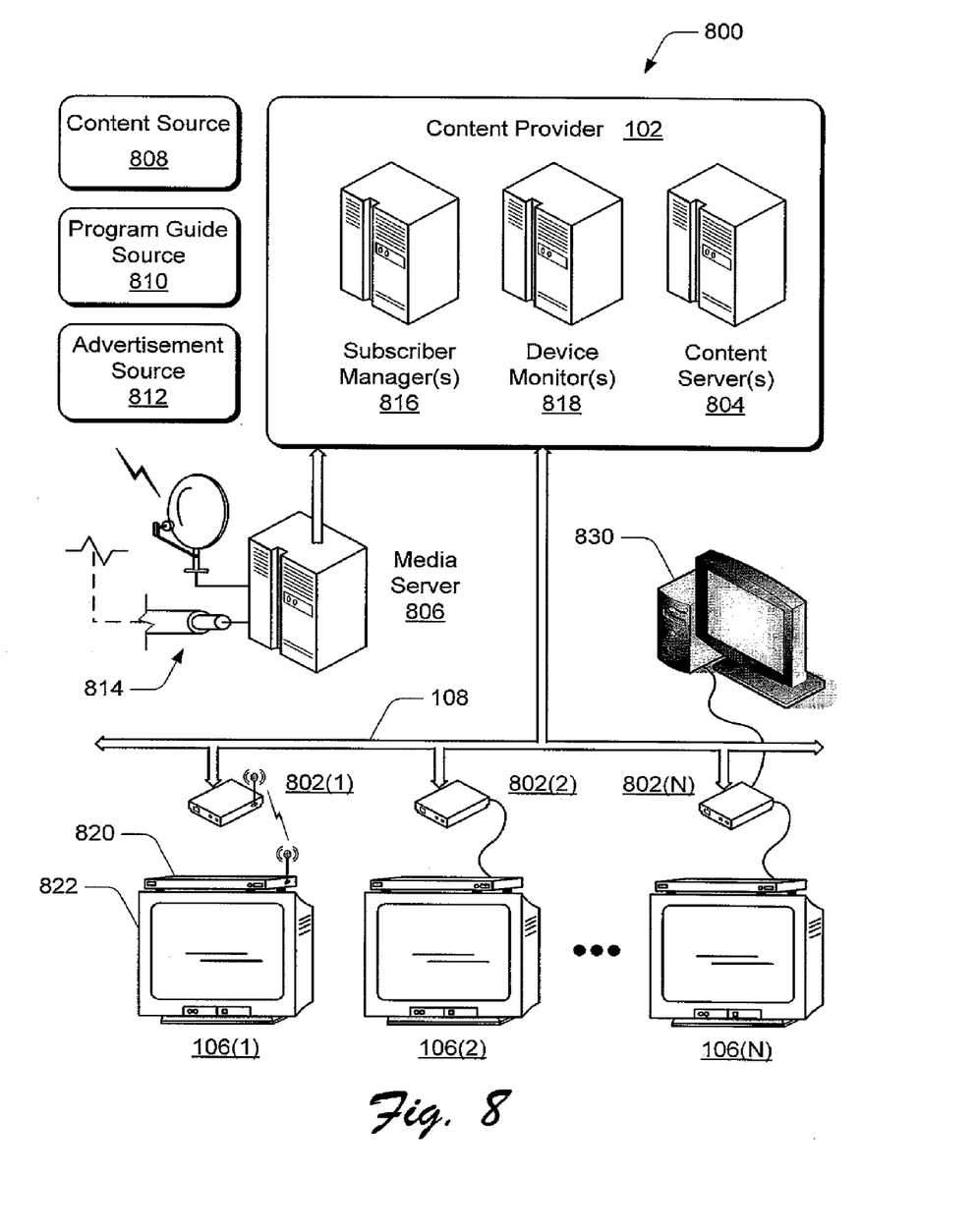
FIG. 8 illustrates a system in an exemplary implementation in which a content provider of FIGS. 1 and 2 is shown in greater detail.

FIG. 8 illustrates a system 800 in an exemplary implementation in which the content provider 102 is shown in greater detail. System 800 facilitates the distribution of program content, program guide data, and advertising content to multiple viewers and to multiple viewing systems. System 800 includes the content provider 102 and the plurality of client devices 106(1)-106(N), each being configured for communication via an IP-based network 108. Each of the client devices 106(1)-106(N), for instance, may receive one or more content streams from the content provider 102 and then arbitrate stream allocation to distribute the content streams (e.g., one to each) to one or more other remote client devices in the viewing system 104.

The communication network 108 may be implemented in a wide variety of ways, such as a wide area network (e.g., the Internet), an intranet, a Digital Subscriber Line (DSL) network infrastructure, a point-to-point coupling infrastructure, and so on. Additionally, the communication network 108 can be implemented using any type of network topology and any network communication protocol, and can be represented or otherwise implemented as a combination of two or more networks. A digital network can include various hardwired and/or wireless links 802(1)-802(N), routers, gateways, and so on to facilitate communication between content provider 102 and the client devices 106(1)-106(N). The client devices 106(1)-106(N) receive content (e.g., television programs, program guide data, advertising content, closed captions data, and the like) from content server(s) 804 of the content provider 802 via the communication network 108.

System 800 may also include a variety of servers to provide functionality, such as to obtain and provide specific types of content. For example, the illustrated system 800 includes a media server 806 that receives program content from a content source 808, program guide data from a program guide source 810, and advertising content from an advertisement source 812. In an embodiment, the media server 806 represents an acquisition server that receives the audio and video program content from content source 808, an EPG server that receives the program guide data from program guide source 810, and/or an advertising management server that receives the advertising content from the advertisement source 812.

The content source 808, the program guide source 810, and the advertisement source 812 control distribution of the program content, the program guide data, and the advertising content to the media server 806 and/or to other servers. The program content, program guide data, and advertising content is distributed via various transmission media 814, such as satellite transmission, radio frequency transmission, cable transmission, and/or via any number of other wired or wireless transmission media. In this example, media server 806 is shown as an independent component of system 800 that communicates the program content, program guide data, and advertising content to content provider 102. In an alternate implementation, media server 806 can be implemented as a component of content provider 102.

Content provider 102 in the system 800 of FIG. 8 is representative of a headend service in a television-based content distribution system, for example, that provides the program content, program guide data, and advertising content to multiple subscribers, e.g., the client devices 106(1)-106(N). The content provider 102 may be implemented in a variety of ways, such as a satellite operator, a network television operator, a cable operator, and the like to control distribution of program and advertising content, such as movies, television programs, commercials, music, and other audio, video, and/or image content to the client devices 106(1)-106(N).

Content provider 102 includes various components to facilitate content processing and distribution, such as a subscriber manager 816, a device monitor 818, and the content server 804. The subscriber manager 816 manages subscriber data, and the device monitor 818 monitors the client devices 106(1)-106(N) (e.g., and the subscribers), and maintains monitored client state information.

Although the various managers, servers, and monitors of content provider 102 (to include the media server 806 in an embodiment) are illustrated and described as distributed, independent components of content provider 102, any one or more of the managers, servers, and monitors can be implemented together as a multi-functional component of content provider 102.

The client devices 106(1)-106(N), as previously described, may be implemented in any number of embodiments, such as a set-top box, a digital video recored (DVR) and playback system, a personal video recorder (PVR), an appliance device, a gaming system, and as any other type of client device that may be implemented in a television-based entertainment and information system. In an alternate embodiment) client device 106(N) is implemented via a computing device. Additionally, any of the client devices 106(1)-106(N) can implement features and embodiments of token bandwidth portioning as described herein.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented in a television-based entertainment or information system for managing a plurality of streams of content output from a content provider, the method comprising:

managing authorization for a client device to receive a stream of content output from the content provider at least in part through the use of a limited number of separate and distinguishable types of tokens, the managing including:

designating, by the content provider, a first token to the stream of content based at least in part on an amount of bandwidth used by the stream of content, assigning a second token to the client device by a manager client device, wherein authorization is granted for the client device to receive the stream of content if the first token assigned designated to the stream of content matches the second token assigned to the client device, and authorization is not granted for the client device to receive the stream of content if the first token designated to the stream of content does not match the second token assigned to the client device;

receiving a request at the client device to navigate to a stream of content available from the content provider over a communication network; and when the client device is not permitted to consume the requested stream of content, outputting a non-modal message which includes a portion that is selectable to cause an output of information describing stream of content consumption by another client device;

receiving a sequential navigation input at the client device to navigate from a first stream of content to a second stream of content that is sequentially ordered in relation to the first stream of content;

when the second stream of content uses an amount of bandwidth that is not authorized for output to the client device, navigating, by the client device, to a third stream of content that matches content available via the second stream of content, the third stream of content not being sequentially ordered in relation to the second stream of content, wherein the third stream of content uses less bandwidth than the second stream of content; and when another sequential navigation input is received, navigating, by the client device, to a fourth stream of content that is sequentially ordered in relation to the second stream of content, wherein sequentially ordered comprises following in a predetermined assigned order.

2. The method as described in claim 1, wherein the client device is not permitted to consume the stream of content when the stream of content uses an amount of bandwidth which is greater than an amount of bandwidth that is permitted to be consumed by the client device.

3. The method as described in claim 1,
wherein:
consumption of streams of content is managed in a viewing system, which includes the requesting client device and the other client device, through the use of tokens; and
the information indicates that the other client device includes a respective said token that permits consumption of the requested stream of content.

4. The method as described in claim 1, wherein:
a fifth said stream of content uses a first amount of bandwidth when communicated over the communication network that is greater than a second amount of bandwidth used by a sixth stream of content when communicated over the communication network;
the permission to consume the amounts of bandwidth by each said client device is managed through use of a plurality of tokens; and
one or more said tokens permit consumption of the first amount of bandwidth but not the second amount of bandwidth.

5. The method as described in claim 4, wherein at least one said token permits consumption of both the first and the second amounts of bandwidth.

6. The method as described in claim 1,
wherein:
each said client device is included in a viewing system;
the content provider allocates a number of streams of content to the viewing system;
a standard definition token is designated to each said allocated stream of content that is standard definition;
a high definition token is designated to each said allocated stream of content that is high definition; and
when the requested stream of content is high definition and the requesting client device is not assigned the high definition token, the requesting client device is not permitted to consume the requested stream of content.

7. The method as described in claim 1, wherein the streams of content include television programs.

8. A method implemented in a television-based entertainment or information system comprising:
managing authorization for content to be output from a content provider to a client device at least in part through the use of a limited number of separate and distinguishable types of tokens, the managing including:
designating, by the content provider, a first token to each of a plurality of streams of content based at least in part on an amount of bandwidth used by each of the plurality of streams of content,
assigning a second token to the client device by a manager client device,
wherein authorization is granted for one of the plurality of streams of content to be output to the client device if the first token designated to the one of the plurality of streams of content matches the second token assigned to the client device, and authorization is not granted for the one of the plurality of streams of content to be output to the client device if the first token designated to the one of the plurality of streams of content does not match the second token assigned to the client device;
receiving a sequential navigation input at the client device to navigate from a first stream of content to a second stream of content that is sequentially ordered in relation to the first stream of content;
when the second stream of content uses an amount of bandwidth that is not authorized for output to the client device, navigating, by the client device, to a third stream of content that matches content available via the second stream of content, the third stream of content not being sequentially ordered in relation to the second stream of content, wherein the third stream of content uses less bandwidth than the second stream of content; and
when another sequential navigation input is received, navigating to a fourth stream of content that is sequentially ordered in relation to the second stream of content, wherein sequentially ordered comprises following in a predetermined assigned order.

9. The method as described in claim 8, wherein the sequential navigation input is input via a remote control.

10. The method as described in claim 8, wherein the first stream of content, the second stream of content, and the fourth stream of content are sequentially ordered television channels.

11. The method as described in claim 1, wherein:
the client device is included in a viewing system; and
the content provider allocates a number of said streams of content to the viewing system for concurrent consumption.

12. The method as described in claim 8, wherein at least one said stream of content includes television programs.

13. The method as described in claim 8, wherein the second stream of content is high-definition content.

14. The method as described in claim 8, wherein the first stream of content, the second stream of content, and the fourth stream of content are sequentially ordered, one to another, in a program guide.

15. One or more computer-readable storage media comprising computer executable instructions that, when executed by a client device implemented in a television-based entertainment or information system, direct the client device to:

determine whether the client device is permitted to use an amount of bandwidth employed by a first television channel when a sequential navigation input is received to navigate to the first television channel,         wherein the client device is assigned a token by a manager client device and the first television channel is assigned another token by a content provider,         and wherein the client device is permitted to use the amount of bandwidth if the token assigned to the client device matches the other token assigned to the first television channel, and the client device is not permitted to use the amount of bandwidth if the token assigned to the client device does not match the other token assigned to the first television channel;

navigate to a second television channel that is not sequentially ordered in relation to the first television channel, the second television channel including content that matches content available via the first television channel, when the determination indicates that the client device is not permitted to use the amount of bandwidth; and     navigate to a third television channel that is sequentially ordered in relation to the first television channel when another sequential navigation input is received during output of content from the second television channel.

16. One or more computer-readable storage media as described in claim 15, wherein:

the client device is one of a plurality of client devices in a viewing system; and     the viewing system is allocated a number of said television channels that are concurrently viewable.

17. One or more computer-readable storage media as described in claim 15, wherein the sequential navigation input is a channel up or channel down command.

18. One or more computer-readable storage media as described in claim 15, wherein the amount of bandwidth corresponds to bandwidth consumed when communicating high-definition content over a communication network.

\* \* \* \* \*

UNITED STATES PATENT AND TRADEMARK OFFICE
CERTIFICATE OF CORRECTION

| | | |
|---|---|---|
| PATENT NO. | : 7,685,306 B2 | Page 1 of 1 |
| APPLICATION NO. | : 11/275649 | |
| DATED | : March 23, 2010 | |
| INVENTOR(S) | : Elizabeth Rose McEnroe et al. | |

It is certified that error appears in the above-identified patent and that said Letters Patent is hereby corrected as shown below:

Please change:

Column 14, line 67, change "...*if the first token assigned*...."

to -- ...*if the first token ~~assigned~~*.... --.

Please remove the word "assigned".

Signed and Sealed this

Fourth Day of May, 2010

David J. Kappos
*Director of the United States Patent and Trademark Office*